United States Patent
Müller

(10) Patent No.: US 9,457,773 B2
(45) Date of Patent: Oct. 4, 2016

(54) LOCKING MECHANISM

(71) Applicant: SAF-HOLLAND GmbH, Bessenbach (DE)

(72) Inventor: Katja Müller, Obernburg (DE)

(73) Assignee: SAF-HOLLAND GmbH, Bessenbach (DE)

( * ) Notice: Subject to any disclaimer, the term of this patent is extended or adjusted under 35 U.S.C. 154(b) by 146 days.

(21) Appl. No.: 14/128,355

(22) PCT Filed: Feb. 7, 2013

(86) PCT No.: PCT/EP2013/052388
§ 371 (c)(1),
(2) Date: Dec. 20, 2013

(87) PCT Pub. No.: WO2013/124157
PCT Pub. Date: Aug. 29, 2013

(65) Prior Publication Data
US 2014/0158961 A1     Jun. 12, 2014

(30) Foreign Application Priority Data

Feb. 20, 2012  (DE) ........................ 10 2012 202 528

(51) Int. Cl.
*B60S 9/06* (2006.01)
*B30B 1/14* (2006.01)
(Continued)

(52) U.S. Cl.
CPC ............... *B60S 9/06* (2013.01); *B29C 45/681* (2013.01); *B30B 1/14* (2013.01); *B60S 9/02* (2013.01);
(Continued)

(58) Field of Classification Search
CPC .......... B60S 9/06; B60S 9/02; B29C 45/681; B30B 1/14; F16H 21/04; F16H 21/44; B60T 7/104; G05G 5/04; Y10T 403/599; Y10T 403/60; Y10T 43/602

USPC ....... 254/418–425, 103, 426, 427, 209, 249; 280/766, 766.1; 74/520, 522, 526, 49, 74/50
See application file for complete search history.

(56) References Cited

U.S. PATENT DOCUMENTS

| | | | | |
|---|---|---|---|---|
| 1,743,241 A | * | 1/1930 | Schmidt | B60K 20/02 403/102 |
| 3,091,978 A | * | 6/1963 | Rubinstein | G05G 1/085 74/545 |

(Continued)

FOREIGN PATENT DOCUMENTS

| DE | 20 2006 012 472 | 12/2006 |
|---|---|---|
| DE | 20 2009 010 846 | 11/2009 |
| DE | 10 2010 062 489 | 6/2012 |

OTHER PUBLICATIONS

SAF Holland Landing Gear Products Brochure at http://products.safholland.us/sites/usa/en-US/products/landinggear/.*
(Continued)

*Primary Examiner* — Monica Carter
*Assistant Examiner* — Mahdi H Nejad
(74) *Attorney, Agent, or Firm* — Price Heneveld LLP

(57) ABSTRACT

A locking mechanism for use on a support winch includes a stator unit, a rotor unit and a locking unit, wherein the rotor unit has a shaft element and a crank element, wherein the crank element is pivotably arranged in relation to the shaft element, wherein the shaft element is rotatably mounted about a rotation axis, and secured to prevent displacement transverse to the rotation axis relative to the stator unit, wherein the locking unit secures the crank element in a first axial position when the crank element is in an idle position to prevent displacement along the rotation axis in at least one direction, and wherein the locking unit secures the crank element to prevent swiveling movement relative to the shaft element when the crank element is in an operating position.

16 Claims, 5 Drawing Sheets

(51) Int. Cl.
  *B60S 9/02* (2006.01)
  *F16H 21/44* (2006.01)
  *G05G 5/04* (2006.01)
  *B60T 7/10* (2006.01)
  *F16H 21/04* (2006.01)
  *B29C 45/68* (2006.01)

(52) U.S. Cl.
  CPC ............ *B60T 7/104* (2013.01); *F16H 21/04* (2013.01); *F16H 21/44* (2013.01); *G05G 5/04* (2013.01); *Y10T 403/599* (2015.01); *Y10T 403/60* (2015.01); *Y10T 403/602* (2015.01)

(56) References Cited

U.S. PATENT DOCUMENTS

| | | | | |
|---|---|---|---|---|
| 3,174,358 | A * | 3/1965 | Wachta | F16D 41/22 192/46 |
| 4,552,034 | A * | 11/1985 | Bertani et al. | G05G 1/087 403/111 |
| 4,590,700 | A * | 5/1986 | Klein | A01K 97/14 43/5 |
| 4,796,864 | A * | 1/1989 | Wilson | B60S 9/08 254/103 |
| 5,085,433 | A * | 2/1992 | Parsons | F41C 23/16 42/1.16 |
| 6,116,123 | A * | 9/2000 | Chen | B25B 15/02 81/177.2 |
| 6,893,006 | B2 * | 5/2005 | Drake, III | B60S 9/08 254/419 |
| 7,083,196 | B2 * | 8/2006 | Riedl | B60S 9/08 248/188.2 |
| 7,891,271 | B2 * | 2/2011 | Grant | B62K 23/08 123/185.5 |
| 8,091,922 | B2 * | 1/2012 | McMahan | B60S 9/08 254/420 |
| 8,136,840 | B2 * | 3/2012 | Riedl | B60S 9/08 254/419 |
| 8,251,423 | B1 * | 8/2012 | Lingle | B60R 3/00 296/1.02 |
| 8,276,941 | B2 * | 10/2012 | Riedl | B60S 9/08 280/763.1 |
| 8,523,148 | B2 * | 9/2013 | Beck | B60D 1/66 254/100 |
| 2006/0202460 | A1 * | 9/2006 | Baxter | B60S 9/08 280/763.1 |
| 2007/0257243 | A1 | 11/2007 | Cofer | |
| 2010/0164213 | A1 * | 7/2010 | Riedl | B60S 9/08 280/766.1 |
| 2011/0108685 | A1 * | 5/2011 | Liu | F16M 11/08 248/178.1 |
| 2011/0115205 | A1 * | 5/2011 | Riedl | B60S 9/08 280/766.1 |
| 2013/0071177 | A1 * | 3/2013 | Wang | F16B 19/109 403/167 |
| 2015/0010346 | A1 * | 1/2015 | Wang | F16B 5/0088 403/322.4 |
| 2016/0003271 | A1 * | 1/2016 | Wang | F16B 5/00 403/322.4 |

OTHER PUBLICATIONS

SAF Holland Landing Gear Products Catalog.*
European Patent Office, International Search Report, May 15, 2013.

* cited by examiner

Fig. 6A
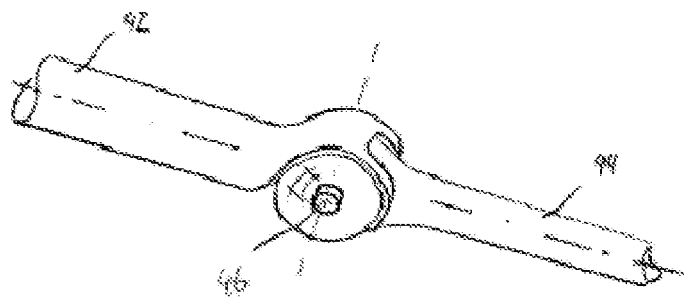
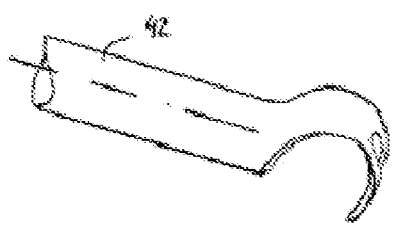
Fig. 6B
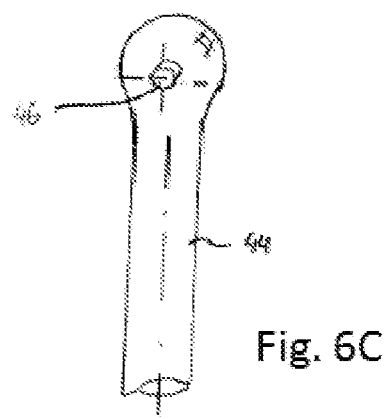
Fig. 6C

LOCKING MECHANISM

BACKGROUND OF THE INVENTION

The present invention relates to a locking mechanism, in particular for use on a support winch of a commercial vehicle.

Locking mechanisms are known from the state of the art insofar as an element for driving a thread, for example, may be locked in different positions. Here, the respective element is arranged in particular in an idle position and in an operating position. In the operating position, the crank element is arranged such that it may exert or transmit a force or a momentum to a gear mechanism or a similar drive unit, by means of which the support winch is extended. However, the drive units for a support winch known from the state of the art have the problem that, while force is transmitted to the element, force components may act on the gear mechanism along the rotation axis, which leads to an unfavorable load on and damage to the gearwheels of the gear mechanism and may lead to a canting of the transmission input shaft.

Thus, the object underlying the present invention is to provide a locking mechanism locking a crank element in a position in which there may be no force components along the rotation axis or diagonally thereto while a drive momentum or a drive torque is transmitted.

SUMMARY OF THE INVENTION

According to the invention, the locking mechanism comprises a stator unit, a rotor unit and a locking unit, wherein the rotor unit has a shaft element and a crank element, wherein the crank element is pivotably arranged in relation to the shaft element, wherein the shaft element is rotatably mounted about a rotation axis, and secured to prevent displacement transverse to the rotation axis relative to the stator unit, wherein, when the crank element is in an idle position, the locking unit is designed to secure the crank element in a first axial position to prevent displacement along the rotation axis in at least one direction, and wherein, when the crank element is in an operating position, the locking unit is designed to secure the crank element to prevent swiveling movement relative to the shaft element. Particularly preferably, the stator unit is the housing of the gear mechanism or transmission or the outer tube of a support winch of a commercial vehicle. There is provided a rotor unit rotatably relative to the stator unit, wherein the rotor unit has a shaft element and a crank element. Particularly preferably, the shaft element is the drive axle or the input shaft of a gear mechanism of a support winch of a commercial vehicle. Preferably, the crank element is a mechanical auxiliary means for transmitting a drive torque or a driving force to said shaft element. Particularly preferably, the crank element is a hand crank, at which the user of a support winch applies a rotary force or a torque. According to the invention, the crank element is pivotably arranged relative to the shaft element, wherein the pivotability makes it in particular possible to fold away the crank element while it is not in use. The shaft element is rotatably mounted about a rotation axis, wherein the rotation axis preferably is directed perpendicularly or essentially transversely to a wall of the stator unit. Further preferably, the stator unit has a bore through which the shaft element passes and in which the shaft element is secured against displacement transverse to the rotation axis relative to the stator unit. Particularly preferably, the recess or the bore in the stator unit may be designed as a sliding contact bearing or roller bearing in order to make it possible to easily turn the shaft element in the recess of the stator unit. Preferably, the locking unit is designed sleeve-shaped at least in certain portions and arranged at one side of the stator unit and, thus, particularly preferably acts as a guide for the crank element and/or the shaft element and as a distance piece or spacer, which secures the crank element at least in one direction against displacement along the rotation axis relative to the stator unit. Particularly preferably, in the idle position, it should be ensured that the crank element is secured against displacement along the rotation axis, for example in order to maintain the crank element in a position in which it is not in engagement with the shaft element. Alternatively preferably, a shaft element connected to the crank element is fixed in an axial position, in which the shaft element does not positively engage a gear mechanism, i.e., to put it differently, it is in the idle gear stage. In a second position of the crank element, hitherto referred to as operating position, the crank element is preferably designed to transmit a torque to the shaft element, for example in order to drive the gear mechanism of a support winch. While the crank element is in the operating position, a preferred object of the locking unit is to secure the crank element against a pivoting or swiveling movement relative to the shaft element. In the operating position of the crank element, the locking unit, which preferably is designed as a hollow body or sleeve-shaped, is displaced or put over the crank element at least over a certain area so as to prevent a swiveling movement of the crank element relative to the locking unit. This ensures at least over a certain area a positive engagement of the crank element with the locking unit which is designed sleeve-shaped at least in certain portions. It may be preferred that a sleeve-shaped section of the locking unit is moved or put over the joint or the swivel joint between the crank element and the shaft element in order to prevent swiveling movements of the crank element relative to the shaft element. In this way, it can be ensured that the crank element makes a rotary movement essentially precisely about the rotation axis, and a force, which is transmitted by the user to the crank element in a plane standing perpendicularly to the rotation axis, will not lead to a diagonal position of the crank element, wherein a load on the gear mechanism is reduced or prevented by means of force components running along the rotation axis.

In a preferred embodiment, the locking unit has a first guide portion, which is arranged along the rotation axis displaceably relative to the crank element, wherein the guide portion may be brought into a locking position relative to the crank element, in which the crank element is secured against swiveling or pivoting relative to the shaft element. It is particularly preferred that the first guide portion is displaceable relative to the crank element. In a first, preferred embodiment, the first guide portion is displaceable relative to the stator unit and may be moved or put over the crank element without displacing the latter along the rotation axis. In order to reset the crank element from the operating position into the idle position, at first the locking unit is moved or brought into a position in which, when seen from the shaft element, it will not project beyond the swivel joint between the shaft element and the crank element and swiveling movements of the crank element are again possible. Then, the crank element may again be pivoted into the idle position. In an alternatively preferred embodiment, the crank element is displaceable along the rotation axis relative to the stator unit and the locking element and, particularly preferably, it may be inserted into the locking unit. Furthermore, preferably also the locking unit and the crank element along the rotation axis may be arranged displaceably relative to one another and relative to the stator unit, wherein it is particularly preferably possible to adjust a locking position of the first guide portion of the locking unit relative to the crank element with the help of a resetting element.

Preferably, the locking unit has a support portion, which is fixed to the stator unit in order to secure the locking unit against displacement relative to the stator unit in at least one plane standing transversely to the rotation axis. In a first preferred embodiment, the support portion of the locking unit is a sliding contact bearing or a corresponding surface in a sliding contact bearing of the locking unit of a sliding contact bearing, which prevents a movement of the locking unit relative to the stator unit along a plane directed transversely to the rotation axis or in a plane directed transversely to the rotation axis. In this embodiment, the locking unit is displaceable along the rotation axis relative to the stator unit. In a further preferred embodiment, the support portion may also be a surface of the locking unit, which is fixed to the stator unit in a substance-to-substance connection, by an adhesive or welded connection, for example, wherein the locking unit may be designed single-piece and the first guide portion is preferably a cylindrical lateral surface supporting the crank element in its operating position. Alternatively preferably, the first guide portion is an element, which is displaceable relative to the stator unit and to the support portion along the rotation axis, which element preferably is supported by the support portion against displacement transverse to the rotation axis. The support portion of the locking unit particularly preferably may also be designed as a flange having respective recesses, which are engaged by fastening means such as bolts/screws in order to positively or frictionally fix the locking unit to the stator unit.

Preferably, there is provided a resetting element which, when the operating position of the crank element is reached, brings the first guide portion and the crank element in locking position relative to each other. Particularly preferably, the resetting element is a coil spring, which is arranged such that a first end of the coil spring rests against the support portion of the locking unit or of the stator unit and a second end rests either against the guide portion of the locking unit or against one of the elements crank element or shaft element. It is preferred that the resetting element seeks an idle position, in which the crank element and the first guide portion of the locking unit have been brought in the locking position relative to each other, i.e. in a position relative to each other, in which the first guide portion secures the crank element in its operating position against swiveling or pivoting relative to the shaft element.

In a preferred embodiment, the resetting element with a first end engages at the support portion and/or at the stator unit and with a second end engages at the first guide portion, wherein it transmits a resetting force to the first guide portion so as to displace the first guide portion away from the stator unit and, thus, to bring it into the locking position. Preferably, the resetting element is designed as a compression spring, which is arranged between a respective engagement surface of the first guide portion and the stator unit or the support portion, respectively, and seeks an idle position, in which the distance between the guide portion and the stator unit is enlarged. To put it differently, in order to bring the first guide portion into the locking position, it is preferably displaced away from the stator unit.

In an alternatively preferred embodiment, the resetting element with a first end engages at the support region and/or at the stator unit and with a second end it engages at the shaft element in order to bring the crank element, which preferably is coupled to the shaft element, into the locking position. Particularly preferably, the shaft element has a landing or a collar, which may be engaged by a resetting element designed optionally as tension or compression spring, in order to displace the shaft element along the rotation axis. The displacement direction is characterized in particular in that the shaft element pulls or pushes the crank element preferably coupled thereto into the operating position. In particular in case that an end of the shaft element opposite the crank element has a gearwheel, which by displacement along the rotation axis is brought into an engagement position with a gear mechanism, it may be preferred that, when said engagement position in the gear mechanism is reached, the crank element is simultaneously brought into the operating position. In this case, the displacement direction is preferably a direction towards the gear mechanism or away from the user who uses the crank element.

In a further preferred embodiment, the locking unit has a second guide portion, which is designed to secure the crank element in the idle position against rotation about the rotation axis. In order to secure the crank element against rotation about the rotation axis in the idle position, in the transport position of the locking mechanism, for example, the locking unit preferably comprises a second guide portion. Said second guide portion may preferably be a recess or cavity in the locking unit transverse to the rotation axis. Preferably, the crank element, in order to be brought from its operating position into the idle position, pivots into the second guide portion so that in the idle position it is secured by the second guide portion in particular against a rotational movement about the rotation axis. It may be further preferred to provide an undercut in the second guide portion, into which the crank element may be forcefully pushed so as to fix the crank element preferably in the idle position. Overcoming the positive locking by means of the undercut and using the elastic behavior of the manufacturing material of the locking unit and of the crank unit, the user may then displace the crank element again from the idle position into the operating position by applying a leverage force to the crank element. Particularly preferably, it is in this way possible to maintain the crank element in the idle position while the commercial vehicle is in travel. This avoids clattering or free movements of the crank element, which might lead to damage to the crank element and the surrounding components of the commercial vehicle.

In a particularly preferred embodiment, the rotor unit comprises at least one engagement means, which may be brought into engagement with at least one engagement means of the locking unit so as to secure the rotor unit against displacement along the rotation axis. The engagement means on the rotor unit and the engagement means on the locking unit preferably engage each other such that the rotor unit is secured in a certain axial position along the rotation axis relative to the locking unit and relative to the stator unit, respectively, and is simultaneously mounted rotatably. Particularly preferably, it is in this way possible to mount the rotor unit such that it is rotatable in at least two axial positions relative to the rotation axis and such that it is secured against displacement along the rotation axis. It may be particularly preferred that the rotor unit engages a gear mechanism, and by means of adjusting a certain axial position a certain gear in the gear mechanism may be selected. Thus, it is possible to choose for example between a fast gear, in which a low rotational speed at the crank element is transformed into a high rotational speed at the transmission output, and a low gear, in which a relatively smooth-running, high rotational speed at the crank element is transformed into a low rotational speed and a great torque at the transmission output.

Particularly preferably, the engagement means of the locking unit is formed as a radial circumferential recess over a certain area transverse to the rotation axis, wherein the engagement means on the rotor unit is designed as a projection corresponding thereto at least over a certain area. To put it differently, the locking unit comprises a radial circumferential groove and the rotor unit comprises a corresponding, for example cylinder-shaped, projection engaging the circumferential groove. Particularly preferably, the engagement means of the locking unit is provided on that part of the locking unit which is designed rigid and immobile relative to the stator unit along the axial axis so as to be able to particularly preferably adjust an axial position of the rotor unit relative to the stator unit. It may be further preferred that the locking unit comprises a plurality of radial circumferential recesses, wherein in this case there is provided preferably at least one axially running recess in the locking unit, which connects the radially running recesses. The engagement means of the rotor unit is guided in this axially running recess along the rotation axis, until, in a certain axial position, it may engage a recess running radially about the rotation axis and is mounted rotatably in said axial position. In order to avoid canting of the engagement means of the rotor unit in the engagement means of the locking unit, it may be preferred to provide the transition zones or crossing zones between the axially running recesses and the radially running recesses of the locking unit with rounded or with sloped edges. Preferably, the engagement means of the rotor unit is a journal provided on the crank element. Alternatively preferably, the engagement means of the rotor unit may be a journal provided on the shaft element or an additional element connecting the crank element and the shaft element.

In a particularly preferred embodiment, the crank element in its idle position is not in engagement with the shaft element. To put it differently, the crank element, while it is in its idle position, is not mechanically coupled to the shaft element, wherein it is at the same time prevented that an inadvertent actuation of the crank element in its idle position leads to a rotation of the shaft element and, thus, to a possibly inadvertent displacement of the gear mechanism or the supporting foot. Particularly preferably, the crank element at its front end facing the shaft element preferably comprises engagement means which positively engage corresponding engagement means of the shaft element in order to be able to transmit a torque to the shaft element when the crank element is in the operating position. Here, it is particularly preferable that the positive fit between the crank element and the shaft element may be made by axially displacing the two elements relative to each other. For example, both the crank element and the shaft element have a fork-shaped geometry at the front end facing the respective other element. Alternatively preferably, the crank element has a hexagonal geometry, which engages an internal-hexagon recess of the shaft element. Particularly preferably, the crank element in the idle position by means of at least one suitable projection engages at least one corresponding recess of the locking unit, wherein the crank element is axially displaced between the idle position and the operating position particularly preferably along a path given by the recess and, at the same time, the swiveling or pivoting movement of the crank element relative to the shaft element is made possible. In a further preferred embodiment, the shaft element may have a claw-shaped geometry engaging a geometry of the crank element, which has an undercut, and after swiveling or pivoting the crank element into the operating position provides a positive fit, which transmits torques about the rotation axis and forces along the rotation axis between the crank element and the shaft element. In the idle position of the crank element, said form fit may be easily released. It is advantageous to mechanically decouple the shaft element and the crank element while the crank element is in its idle position, in particular in that an inadvertent displacement or turn or rotation of the crank element will not lead to an inadvertent rotational movement of the shaft element.

Alternatively preferably, the crank element is pivotably fixed to the shaft element by means of a pin element. The pin element is any fastening means which makes it possible to rotatably or pivotably fasten the crank element and the shaft element to one another, for example a cylinder-shaped pin. This embodiment is characterized in particular in that the crank element both in its idle position and in its operating position is pivotably fixed to the shaft element, wherein also in the idle state or in the idle position of the crank element a rotational movement of the crank element about the rotation axis would also lead to a rotational movement of the shaft element. However, the advantage of this embodiment is that by means of the pin element there is ensured a reliable and stable mechanical connection or coupling of the crank element to the shaft element and the transmission of large forces and torques is ensured. Furthermore, the disadvantage of the permanent mechanical coupling of the crank element to the shaft element may be compensated by means of a rotational lock of the crank element in its idle position. Such a rotational lock may be provided by means of one or a plurality of second guide portions of the locking unit, for example.

In a further preferred embodiment, the pin element extends beyond the shaft element and/or the crank element transverse to the rotation axis such that it forms an engagement means of the rotor unit. To put it differently, preferably the ends of the pin element extending radially beyond the shaft element and/or the crank element simultaneously serve as engagement means of the rotor unit, as they have been described above, which in turn engage respective engagement means of the locking unit. This leads to the following simple course of transition of the crank element from the idle position into the operating position: swiveling or pivoting the crank element relative to the shaft element and the fulcrum, which is defined by the pin element or by rotatably or pivotably fastening the crank element to the shaft element. When the operating position of the crank element has been reached, preferably the guide portion of the locking unit is displaced by the resetting element or the user relative to the crank element such that the crank element is locked in the operating position. Furthermore, the rotor unit, i.e. the crank element together with the shaft element, is displaced along the rotation axis such that the at least one engagement means of the rotor unit is in engagement with one respective axial longitudinal groove or a respective engagement means of the locking unit, as long as an engagement means of the locking unit, which engagement means is formed as circumferential radial groove, is reached by the engagement means of the rotor unit. When the engagement means of the rotor unit engages the radial circumferential engagement means of the locking unit, the rotor unit is rotatable about the rotation axis and relative to the locking unit. During the rotation, the rotor unit is secured against axial displacement, i.e. displacement along the rotation axis, relative to the locking unit, except for those points in which the engagement means of the rotor unit runs through the crossing point between a radial groove and an axially running groove.

In a further preferred embodiment, the crank element, in the operating position, at least in the engagement region with the shaft element and/or the locking unit is directed collinearly to the rotation axis. Alternatively, it is also possible to define the operating position of the crank element by directing the crank element in the engagement region with the shaft element perpendicularly to the rotation axis. In this case, the crank element may also be designed as a single-curved crank only, while in the case described in the beginning, the crank element has at least two curves, wherein the section between the two curves of the crank element defines the lever arm of the force transmitting a momentum or torque to the shaft element.

Further advantages and features become apparent from the following description of preferred embodiments of the present invention with reference to the appended Figures. Individual features of the individual embodiments may be combined within the framework of the invention.

DETAILED DESCRIPTION OF THE PREFERRED EMBODIMENTS

Figure 1A:
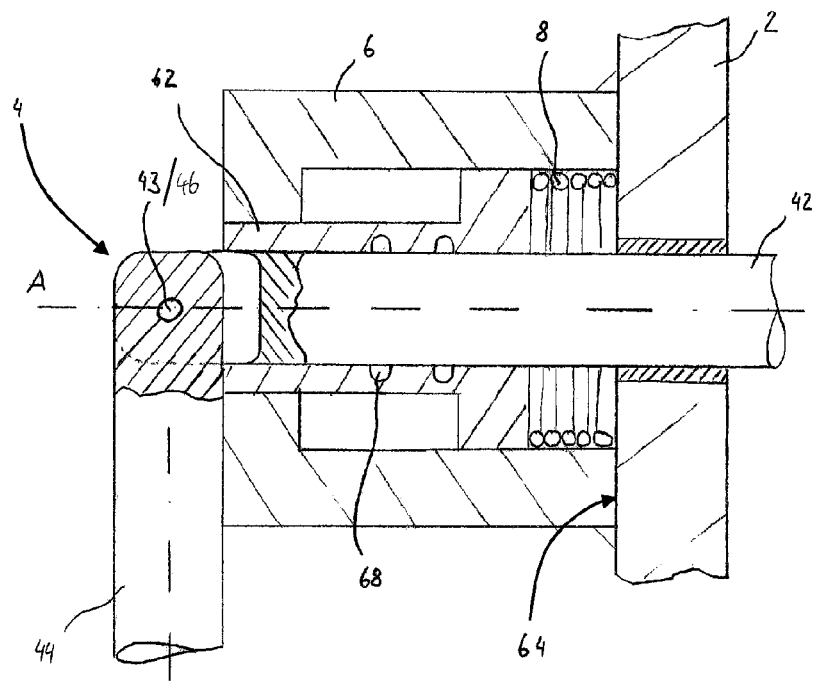
FIG. 1a a sectional view of a preferred embodiment of the locking unit of the invention in the idle position, FIG. 1b the locking unit shown in FIG. 1a in the operating position, FIG. 2a a sectional view of a further preferred embodiment of the locking unit of the invention in the idle position, FIG. 2b the locking unit shown in FIG. 2a in the operating position, FIG. 3a a sectional view of a further preferred embodiment of the locking unit of the invention in the idle position, FIG. 3b the locking unit shown in FIG. 3a in the operating position, FIG. 4 a sectional view of a further preferred embodiment of the locking unit of the invention in the idle position, FIG. 5 a view of preferred embodiments of a first guide portion and of the engagement means of the locking unit, and FIGS. 6A-6C views of an alternative embodiment for a connection of the shaft element with the crank element to the rotor unit.
Figure 1B:
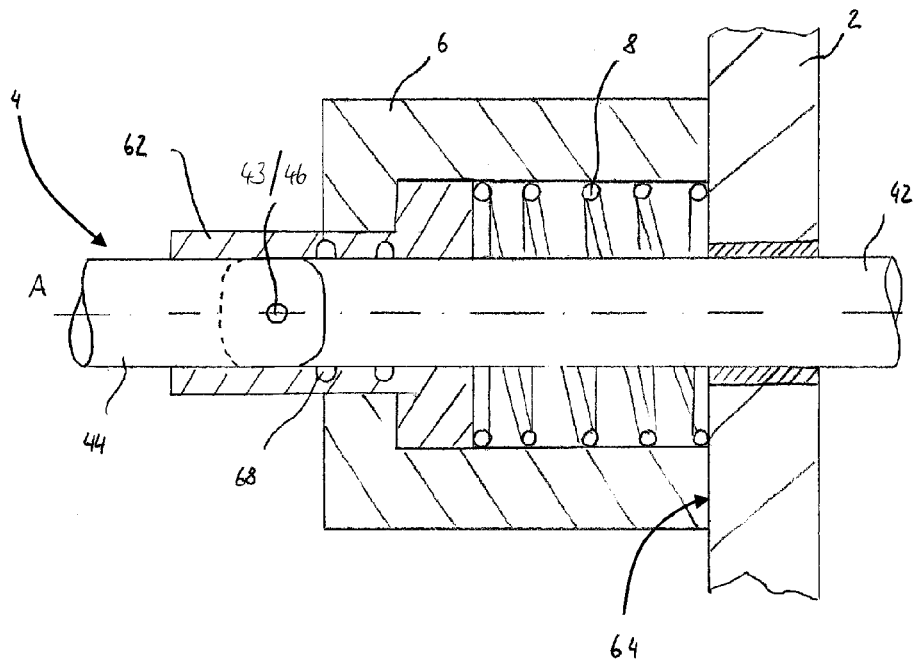

FIG. 1a shows a preferred embodiment of the locking mechanism according to the invention, in particular for use in a support winch. According to the invention, there are provided a stator unit 2, a rotor unit 4 and a locking unit 6, wherein the rotor unit 4 comprises a shaft element 42 and a crank element 44. The shaft element 42 is mounted rotatably about the rotation axis A and secured against displacement transverse to the rotation axis A relative to the stator unit 2 in the first guide portion 62. Furthermore, the first guide portion 62 via a resetting element 8 rests preferably against the stator unit 2. The resetting element 8 is preferably designed as a coil spring. Alternatively preferably, the resetting element may be formed as an elastomer part such as a rubber socket. In the idle position of the crank element 44, the resetting element 8 is preferably pretensioned. Furthermore, the crank element 44 is not secured by the first guide portion 62 against a swiveling movement relative to the shaft element 42. The resetting element 8 exerts a force onto the first guide portion 62 such that it is moved over the crank element 44 as soon as the crank element 44 is in its operating position. In the operating position, shown in FIG. 1b, the crank element 44 is secured by the first guide portion 62 against a swiveling movement relative to the shaft element 42. In order to limit the rebound travel of the guide portion 62, there is preferably provided a stop in the locking unit 6. The locking unit 6 in turn is connected to the stator unit 2 via the support portion 64, preferably by a substance-to-substance bond. The crank element 44 is positively connected to the shaft element 42 via a preferably pin-shaped or cylindrical pin element 43. Preferably, the pin element 43 is designed such that it comprises at least one end extending beyond the shaft element 42 and/or the crank element 44 transverse to the rotation axis A, which end may be used as engagement means 46, so as to be positively guided in the first guide portion 62 by the engagement means 68. In order to make it possible to axially move the engagement means 46 in the first guide portion 62, there is preferably provided an axially running groove, in which the engagement means 46 is guided. In order to allow for a rotational movement of the rotor unit 4 at predetermined axial positions, there are provided in the first guide portion 62 radial circumferential engagement means 68, preferably directed transversely to the rotation axis A, and designed to guide one or a plurality of engagement means 46 along a circular path about the rotation axis A. Particularly preferably, there are provided two engagement means 46 on the rotor unit 4 and advantageously arranged such that they lie opposite each other transverse to the rotation axis A. Furthermore, it is preferred to provide a second guide portion 66, which in the idle position of the crank element 44 prevents a rotational movement of the crank element 44. The second guide portion 66 is preferably a recess transverse to the rotation axis A, the flanks of which secure the crank element 44 against rotation about the rotation axis A. In the preferred case that the crank element 44 in its idle position is coupled to the shaft element 42, the entire rotor unit 4 is secured against rotation about the rotation axis by the second guide portion 66. The engagement means 46 may preferably also be attached to the shaft element 42 or to the crank element 44 or be formed as an integral piece thereof. Furthermore, it is possible to design the engagement means 46 as a recess and the engagement means 68 as a projection.

Figure 2A:
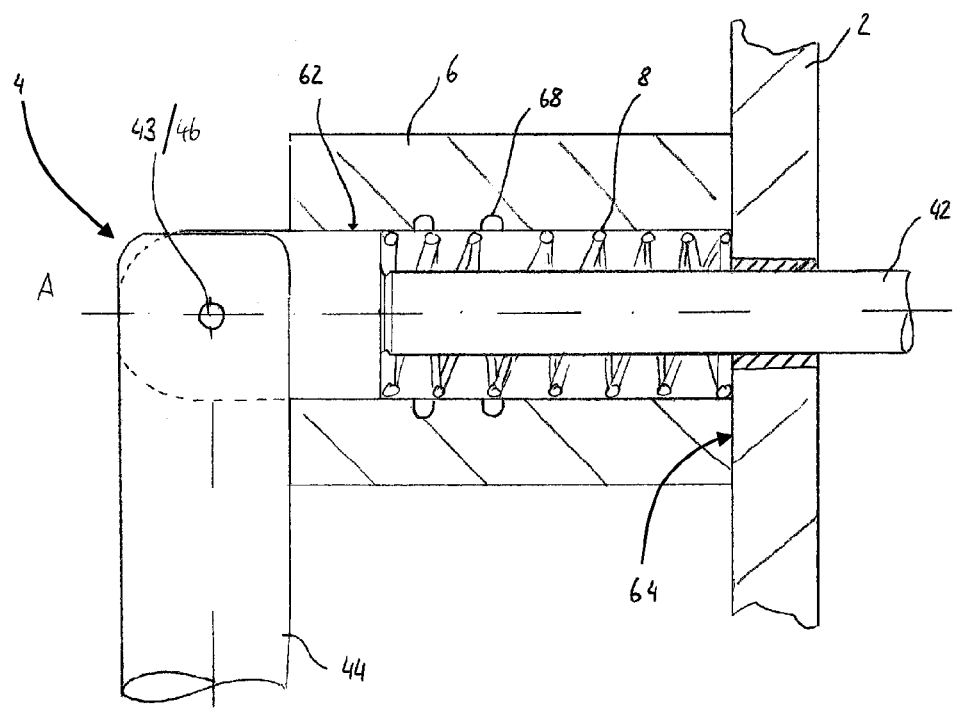

FIG. 2a shows a further preferred embodiment of the locking mechanism according to the invention with an alternative preferred arrangement of the resetting element 8, also preferably designed as a coil spring. The resetting element 8 connects the shaft element 42 and the stator unit 2 such that the resetting element 8 is pretensioned in the idle position of the crank element 44. In the operating position, the crank element 44 is pulled into the first guide portion 62 by the spring force of the resetting element 8, wherein the first guide portion 62 secures the crank element 44 against pivoting. In order to make it possible for the resetting element 8 to rotate, there is preferably provided at both ends of the resetting element 8 a sliding contact bearing or a roller bearing. In the preferred embodiment shown in FIG. 2a, the resetting element 8 is arranged on the left-hand side of the guideway of the shaft element 42 in the stator unit 2 and, therefore, is subjected to tensile forces in the idle position of the crank element 44. Alternatively, a preferred embodiment may be designed such that the resetting element 8 is arranged on the right-hand side, to put it differently at the side of the shaft element 42 facing a gear mechanism, and to subject it preferably to a compressive force in the idle position of the crank element 44. Also in this embodiment, the stator unit 2 and the shaft element 42 are connected by means of the resetting element 8.

Figure 2B:
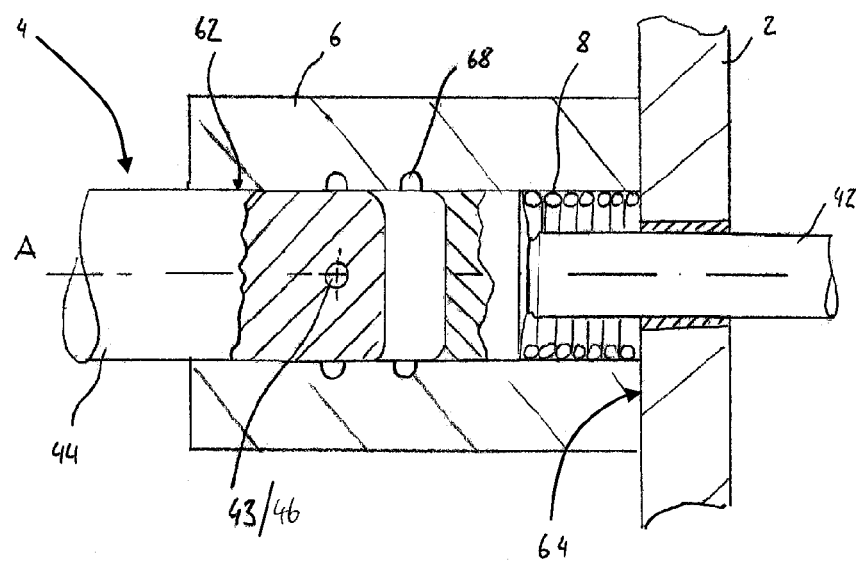

FIG. 2b shows the preferred embodiment from FIG. 2a, wherein the crank element 44 is in its operating position. Preferably, the resetting element 8 is designed such that, insofar as there is a gear mechanism with several gear stages, a gear is already engaged when the crank element transitions from the idle position into the operating position.

Figure 3A:
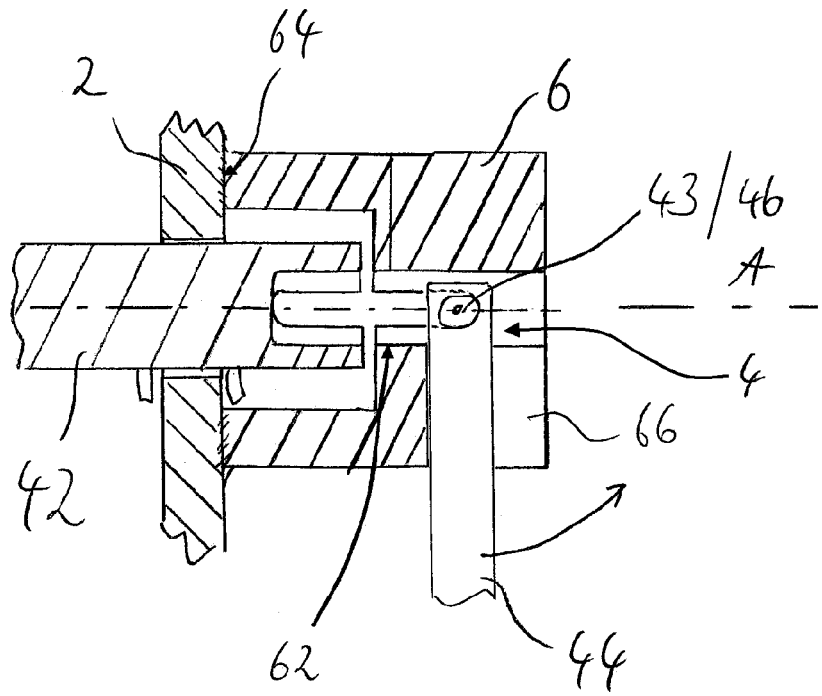
Figure 3B:
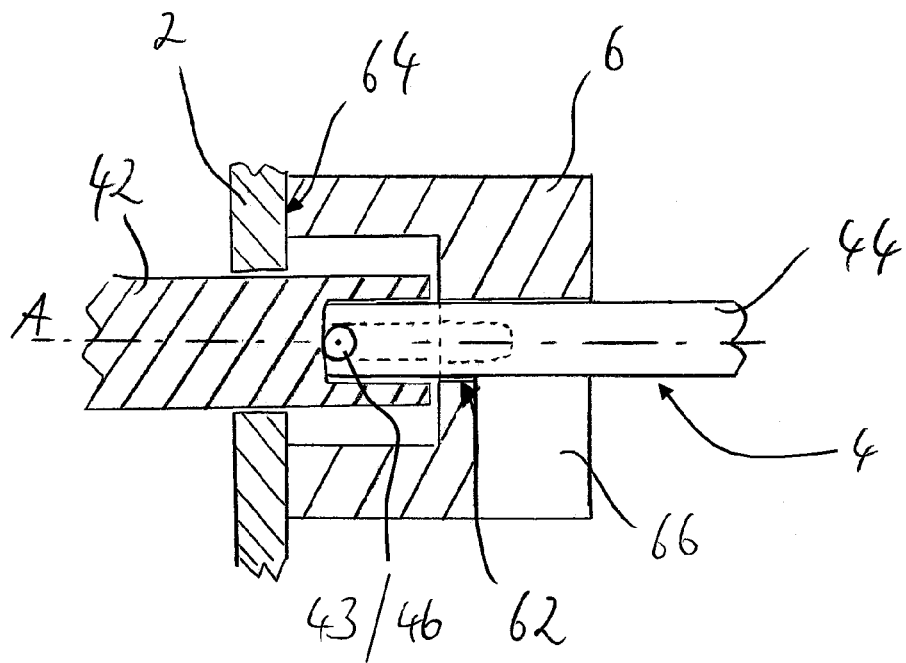

FIG. 3a shows a further preferred embodiment of the locking mechanism according to the invention, wherein the crank element 44 in its idle position is not in engagement with the shaft element 42. In the embodiment shown in FIG. 3a, the locking unit 6 comprises two guide grooves, which preferably are arranged directly radially opposite one another and which serve to hold and fix the crank element 44 in the idle position in the locking unit 6. In addition, said guide grooves make it possible to axially move the crank element 44. Preferably, the guide grooves end in radially or axially running engagement means of the locking unit 6. During the transition into the operating position, the crank element 44 is pushed by a preferably fork-shaped engagement section into a corresponding engagement section of the shaft element 42. Due to the positive fit of the engagement sections on the shaft element 42 and crank element 44, it is preferably possible to transmit a torque. In this position, the crank element 44 is axially guided by the first guide portion 62, as is shown in FIG. 3b. Preferably, the crank element 44 is connected, preferably positively connected, to the shaft element 42 such that there is provided an axially solid connection, which makes it possible to axially move the rotation unit 4 as a whole, in order to engage different gears in a gear mechanism, for example. Alternatively, it is possible to preferably use as fixing means a spring-loaded ball or cylinder element, which fixes the crank element 44 in the shaft element 42, or vice versa.

Figure 4:
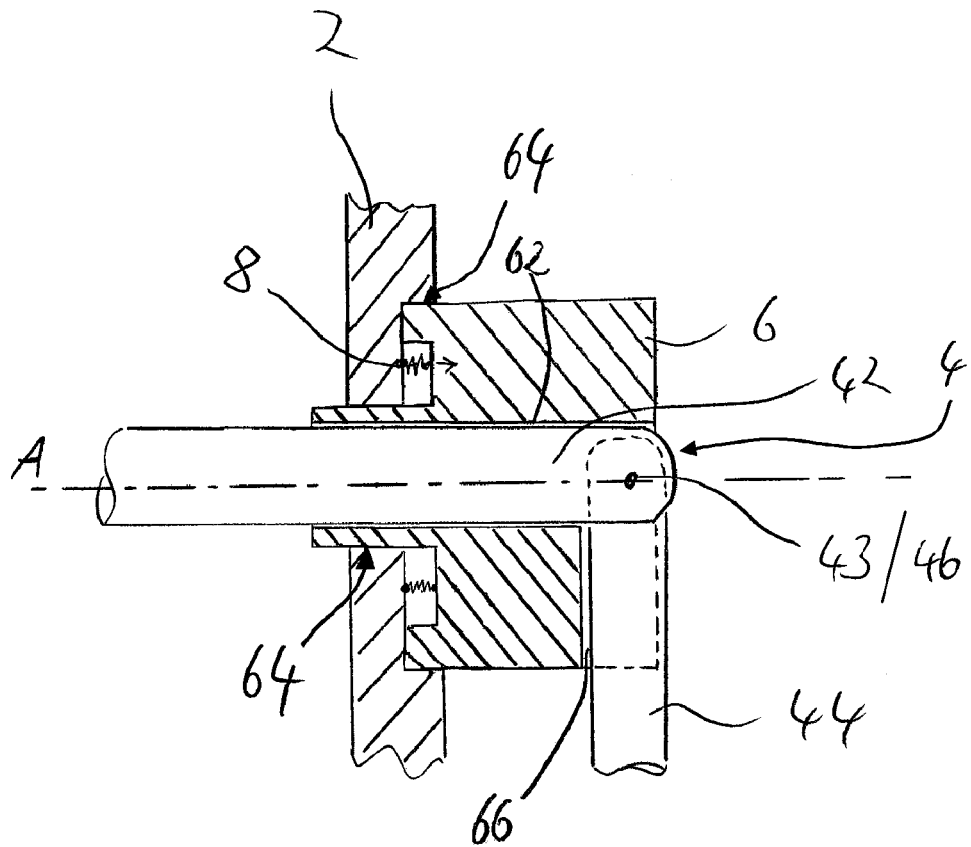

FIG. 4 shows a further preferred embodiment of the locking mechanism according to the invention. The locking unit 6 is guided by the support portions 64 in the stator unit 2 or secured against displacement in at least one respective direction. The different support portions serve to axially guide the locking unit 6 in the stator unit 2 as well as to prevent a rotation about the rotation axis A relative to the stator unit 2, while the crank element 44 is in the idle position. The rotation of the locking unit 6 relative to the stator unit 2 is preferably prevented by a positive connection of the support portion 64 and the stator unit 2.

Figure 5:
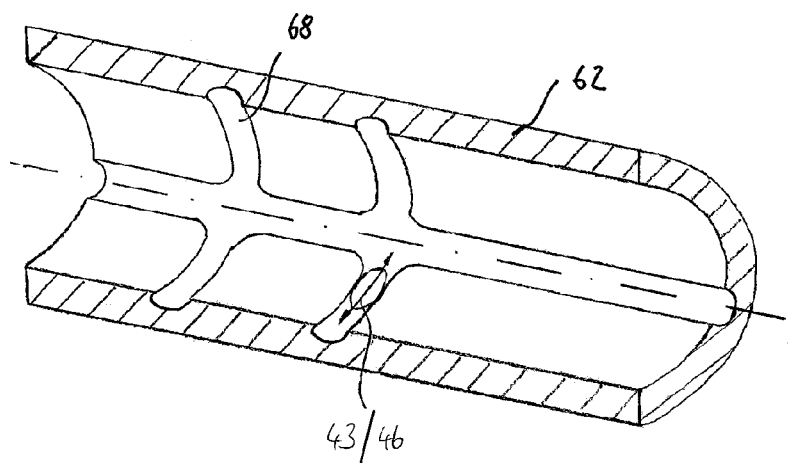

FIG. 5 shows a further preferred embodiment of the first guide portion 62 with engagement means 68, preferably designed as recesses or grooves. The crossing points of the axially running grooves with the radially running grooves are preferably rounded or chamfered so as to make it possible to easily guide the engagement means 46 and in particular so as to prevent canting. As an alternative to the embodiment shown in FIG. 5, preferably also a variant without axial groove is possible in that an engagement means 46 is pretensioned preferably by a spring element radial to the rotation axis A, preferably in the shaft element 42, as long as it is located in the first guide portion 62 and at first slides radially outwards when it reaches the radial circumferential engagement means 68, wherein it positively engages the latter and is guided along a path around the rotation axis A.

FIGS. 6A-6C show a preferred embodiment of the connection between the shaft element 42 and the crank element 44, which makes it possible to provide a positive connection along the rotation axis A and to transmit torques, which, however, makes it also possible to separate them easily, when the crank element 44 is brought into its idle position.

In the foregoing description it will be readily appreciated by those skilled in the art that modifications may be made to the invention without departing from the concepts as disclosed herein. Such modifications are to be considered as included in the following claims, unless these claims by their express language state otherwise.

LIST OF REFERENCE SIGNS

2—stator unit
4—rotor unit
6—6 locking unit
8—resetting element
42—shaft element
44—pin element
44—crank element
46—engagement means
62—first guide portion
64—support portion
66—second guide portion
68—engagement means
A—rotation axis

The invention claimed is:

1. A locking mechanism for use on a support winch, comprising:
    a stator unit;
    a rotor unit; and
    a locking unit;
    wherein the rotor unit has a shaft element and a crank element;
    wherein the crank element is pivotably arranged in relation to the shaft element;
    wherein the shaft element is rotatably mounted about a rotation axis, and secured to prevent displacement transverse to the rotation axis relative to the stator unit;
    wherein when the crank element is in an idle position, the locking unit is secured to the crank element in a first axial position to prevent displacement along the rotation axis in at least one direction and such that the locking unit prevents adjustment of the supporting winch via the crank element;
    wherein when the crank element is in an operating position, the locking unit is secured to the crank element to prevent swiveling movement relative to the shaft element and allow adjustment of the supporting winch via the crank handle; and
    wherein the locking unit has a first guide portion, wherein the crank element and the first guide portion are arranged along the rotation axis displaceable relative to each other, and wherein the first guide portion may be brought into a locking position relative to the crank element, in which the crank element is secured against the swiveling movement relative to the shaft element; and
    wherein the first guide portion and the crank element are brought into a locking position relative to one another by a resetting element when the operating position of the crank element is reached.

2. The locking mechanism of claim 1, wherein the locking unit has a support portion which is fixed to the stator unit such that the locking unit is secured against displacement relative to the stator unit in at least one plane standing transversely to the rotation axis.

3. The locking mechanism of claim 1, wherein the resetting element includes a first end that engages at least one of the support portion and at the stator unit and a second end that engages the first guide portion and exerts a resetting force onto the first guide portion that displaces the first guide portion away from the stator unit thereby bringing the first guide portion into the locking position.

4. The locking mechanism of claim 1, wherein the crank element is coupled to the shaft element.

5. The locking mechanism of claim 1, wherein the rotor unit has at least one first engagement means that is adapted to engage with at least one second engagement means of the locking unit to secure the rotor unit against displacement along the rotation axis.

6. The locking mechanism of claim 5, wherein the engagement means of the locking unit comprises a radial circumferential recess over an area transverse to the rotation axis, and wherein the engagement means comprises projection on at least one of the shaft element and on the crank element.

7. The locking mechanism of any one of claim 1, wherein the crank element is pivotably fixed to the shaft element via a pin element that projects beyond at least one of the shaft element and the crank element transverse to the rotation axis and comprises an engagement arrangement.

8. The locking mechanism of claim 1, wherein the locking unit has a support portion which is fixed to the stator unit such that the locking unit is secured against displacement relative to the stator unit in at least one plane standing transversely to the rotation axis.

9. The locking mechanism of claim 1, wherein the resetting element includes a first end that engages at least one of the support portion and at the stator unit and a second end that engages the first guide portion and exerts a resetting force onto the first guide portion that displaces the first guide portion away from the stator unit thereby bringing the first guide portion into the locking position.

10. The locking mechanism of claim 1, wherein the resetting element includes a first end that engages at least one of the support portion and at the stator unit and a second end that engages the shaft element, thereby bringing the crank element into the locking position.

11. The locking mechanism of claim 10, wherein the crank element is coupled to the shaft element.

12. The locking mechanism of claim 1, wherein the rotor unit has at least one first engagement means that is adapted to engage with at least one second engagement means of the locking unit to secure the rotor unit against displacement along the rotation axis.

13. The locking mechanism of any one of claim 1, wherein the crank element is pivotably fixed to the shaft element via a pin element that projects beyond at least one of the shaft element and the crank element transverse to the rotation axis and comprises an engagement arrangement.

14. The locking mechanism of claim 13, wherein the pin element projects beyond at least one of the shaft element and the crank element transverse to the rotation axis and comprises an engagement arrangement of the rotor unit.

15. A locking mechanism for use on a support winch, comprising:
a stator unit;
a rotor unit; and
a locking unit;
wherein the rotor unit has a shaft element and a crank element;
wherein the crank element is pivotably arranged in relation to the shaft element;
wherein the shaft element is rotatably mounted about a rotation axis, and secured to prevent displacement transverse to the rotation axis relative to the stator unit;
wherein when the crank element is in an idle position, the locking unit is secured to the crank element in a first axial position to prevent displacement along the rotation axis in at least one direction and such that the locking unit prevents adjustment of the supporting winch via the crank element;
wherein when the crank element is in an operating position, the locking unit is secured to the crank element to prevent swiveling movement relative to the shaft element and allow adjustment of the supporting winch via the crank handle; and
wherein the locking unit has a first guide portion, wherein the crank element and the first guide portion are arranged along the rotation axis displaceable relative to each other, and wherein the first guide portion may be brought into a locking position relative to the crank element, in which the crank element is secured against the swiveling movement relative to the shaft element.

16. A locking mechanism for use on a support winch, comprising:
a stator unit;
a rotor unit; and
a locking unit;
wherein the rotor unit has a shaft element and a crank element;
wherein the crank element is pivotably arranged in relation to the shaft element;
wherein the shaft element is rotatably mounted about a rotation axis, and secured to prevent displacement transverse to the rotation axis relative to the stator unit;
wherein when the crank element is in an idle position, the locking unit is secured to the crank element in a first axial position to prevent displacement along the rotation axis in at least one direction and such that the locking unit prevents adjustment of the supporting winch via the crank element;
wherein when the crank element is in an operating position, the locking unit is secured to the crank element to prevent swiveling movement relative to the shaft element and allow adjustment of the supporting winch via the crank handle; and
wherein the locking unit has a first guide portion, wherein the crank element and the first guide portion are arranged along the rotation axis displaceable relative to each other, and wherein the first guide portion may be brought into a locking position relative to the crank element, in which the crank element is secured against the swiveling movement relative to the shaft element;
wherein the first guide portion and the crank element are brought into a locking position relative to one another by a resetting element when the operating position of the crank element is reached; and
wherein the first guide portion and the resetting element are movably located within the locking unit.

* * * * *

UNITED STATES PATENT AND TRADEMARK OFFICE
CERTIFICATE OF CORRECTION

PATENT NO. : 9,457,773 B2
APPLICATION NO. : 14/128355
DATED : October 4, 2016
INVENTOR(S) : Katja Müller It is certified that error appears in the above-identified patent and that said Letters Patent is hereby corrected as shown below:

In the Specification

Column 1, Line 48:
"rotatably" should be – rotatable –

Column 3, Line 43:
"elements" should be – element's –

Column 10, Line 12:
Delete "6" ($2^{nd}$ occurrence)

Column 10, Line 15:
"44" should be – 43 –

In the Claims

Column 10, Claim 1, Line 46:
Delete "and"

Column 10, Claim 3, Line 66:
Delete "and" ($1^{st}$ occurrence)

Column 11, Claim 6, Line 14:
After "comprises" insert -- a --

Column 11, Claim 7, Line 17:
Delete "any one of"

Signed and Sealed this
Twentieth Day of June, 2017

Joseph Matal
*Performing the Functions and Duties of the*
*Under Secretary of Commerce for Intellectual Property and*
*Director of the United States Patent and Trademark Office*

Column 11, Claim 9, Line 29:
Delete "and" (1st occurrence)

Column 11, Claim 10, Line 36:
Delete "and" (1st occurrence)

Column 11, Claim 13, Line 46:
Delete "any one of"

Column 12, Claim 16, Line 47:
Delete "and"